United States Patent [19]
Garbolino

[11] 3,830,006
[45] Aug. 20, 1974

[54] CLOSING FERRULES FOR HOLLOW RODS AND CANES, NOTABLY FOR FISHING RODS

[76] Inventor: Henri Garbolino, Route de Sepmes 37800, Sainte Maure De Touraine, France

[22] Filed: May 21, 1973

[21] Appl. No.: 362,204

[52] U.S. Cl..................... 43/23, 24/230 SL, 43/25
[51] Int. Cl............................................. A01k 87/00
[58] Field of Search.......... 43/23, 25, 26; 24/230 SL

[56] References Cited
UNITED STATES PATENTS

| | | | |
|---|---|---|---|
| 1,451,732 | 4/1923 | Hipwood | 224/5 |
| 2,303,053 | 11/1942 | Kneedler | 24/230 SL |
| 2,834,139 | 5/1958 | Needham | 43/23 X |
| 2,962,187 | 11/1960 | Morris | 43/26 X |
| 3,006,098 | 10/1961 | Harke | 43/23 X |

FOREIGN PATENTS OR APPLICATIONS

| | | | |
|---|---|---|---|
| 577,615 | 5/1946 | Great Britain | 43/23 |
| 1,564,048 | 3/1969 | France | 43/23 |
| 618,821 | 4/1961 | Canada | 24/230 SL |

*Primary Examiner*—James H. Czerwonky

[57] ABSTRACT

The ferrule or tip for closing the end of a hollow fishing rod consists of a one-piece body of moulded plastics having a bottom and a peripheral skirt, the latter for capping externally the end of the hollow rod. The skirt is provided with radially expansible longitudinal slots extending up to its free edge and has a locking means consisting of a hole or stud cooperating with a stud or hole on the rod, thus preventing any untimely removal of said ferrule from said rod.

4 Claims, 4 Drawing Figures

PATENTED AUG 20 1974 3,830,006

CLOSING FERRULES FOR HOLLOW RODS AND CANES, NOTABLY FOR FISHING RODS

BACKGROUND OF THE INVENTION

This invention relates to ferrules or tips of the type designed for closing the end of a hollow rod, notably the end of a fishing rod section or element.

DESCRIPTION OF THE PRIOR ART

The increasing demand for casting rods made firstly of light alloy and more recently of stratified fiberglass led to the development of so-called telescopic rods, i.e., rods of which all the sections or elements can be enclosed completely within the major element (or rod heel, case or shroud) with the most valuable advantage of facilitating the handling and transport of such fishing rods. These telescopic or collapsible fishing rods made it particularly necessary to use ferrules having not only a strength sufficient for withstanding the stress due to the weight of the rod components or sections contained in said major element, but also a flexibility permitting the easy fitting and removal of such ferrules, without however attaining a cost likely to increase appreciably the cost of the fishing rod proper.

Among hitherto known propositions concerning such ferrules for fishing rods a most popular type is the so-called plain or "cap" ferrule consisting chiefly of rubber or more frequently of plastic material; these ferrules are adapted to be force fitted to the end of the rod "case" or "heel," so as to cover this end. While such ferrules are advantageous on account of their very low cost, they are objectionable in that they vary with time (due notably to their high sensitivity to temperature variations) and therefore, in case of shock, the ferrule tends to escape, thus permitting the escape and sometimes the loss of rod elements or sections contained in the major element. Moreover, the material from which these ferrules are made, when the ferrules are fitted to varnished rods, tends to react with the rod varnish and make it very difficult to remove the ferrule from the rod.

Another known type of plain ferrule is adapted to engage the inner wall of the heel end to be closed and this device, although not completely reliable, is somewhat more reliable than the ferrule mentioned in the preceding paragraph. On the other hand, its cost is higher. Besides, it is known that rods of gradually decreasing lengths are obtained by removing one by one the rod sections from the major element "case" or "heel" of the rod assembly. Under these conditions, it is clear that, for a same element which, according to circumstances, will be used as a case or as an intermediate section, the manufacturers of inner ferrules are led to provide decreasing lengths from the onset, in order to avoid the multiplication of elements having a same diameter. This procedure entails a substantial reduction in the rod section lengths and therefore such fishing rods are commercially less competitive for obvious reasons.

Another proposition was made, therefore, which consists of a screw ferrule of which the female portion is internally threaded or tapped and adapted to be cemented to the outer surface of the end of the fishing rod case or major section, the cap-forming male portion of the ferrule being simply screwed in said female portion. Ferrules of this type are characterised by a complete safety in actual use, but in addition to their particularly and relatively high cost they require a perfect fit between the outer diameter of the case end and the inner diameter of the female portion of the ferrule which is to be cemented thereto.

SUMMARY OF THE INVENTION

It is the chief object of the present invention to avoid the inconveniences characterizing the various types of fishing rod ferrules broadly discussed hereinabove by providing to this end a ferrule of relatively low cost (for example of the order of conventional external plain ferrules), which does not require any preliminary adaptation or conversion of the fishing-rod element or section to which said ferrule is to be fitted, and having nevertheless the same degree of safety and reliability as conventional screw ferrules.

The ferrule according to this invention comprises a one-piece moulded plastic body having a bottom and a skirt, and is characterized in that said skirt adapted to cap the hollow rod end, is made for being expansible due to longitudinal slots and incorporates at least one locking element adapted to engage a matching element carried by the end of the rod element or section to which the ferrule is to be fitted, so as to firmly secure the ferrule in position and prevent any untimely removal thereof.

According to a preferred form of embodiment of the ferrule of this invention, the locking element formed therein consists of an opening engageable in the locking position by a stud projecting radially from the outer surface of the rod end, axial slots being formed in the skirt of said ferrule, to provide on the one hand certain tolerances in the diameters of the rod section and the ferrules, and on the other hand a certain clearance in the ferrule whereby the aforesaid stud can be slipped under the skirt until said stud engages said opening, while permitting, for releasing the ferrule, the exertion of a radial outward force on a small lug moulded integrally with the ferrule.

According to a modified form of embodiment, said stud may be carried by the inner surface of the ferrule skirt and adapted to engage a corresponding opening formed in the rod end, the ferrule skirt still comprising said axial slots and a pull lug for releasing the ferrule from the rod element.

In order to afford a clearer understanding of this invention a typical form of embodiment thereof will now be described by way of example with reference to the accompanying drawing, in which:

DESCRIPTION OF THE PREFERRED EMBODIMENT

Figure 1:
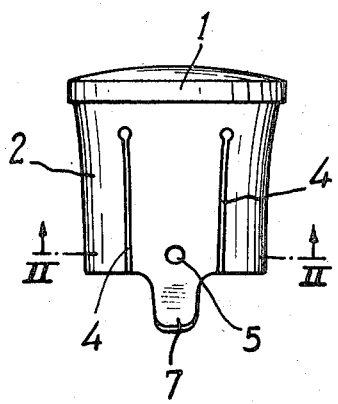
FIG. 1 is a front elevational view of a ferrule according to this invention for closing the end of a fishing-rod element or section.
Figure 2:
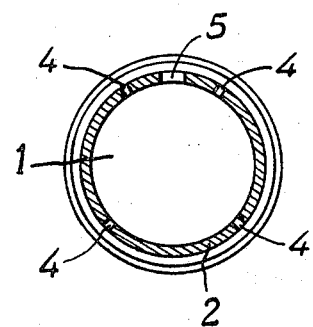
FIG. 2 is a cross-section taken along the line II—II of FIG. 1.
Figure 3:
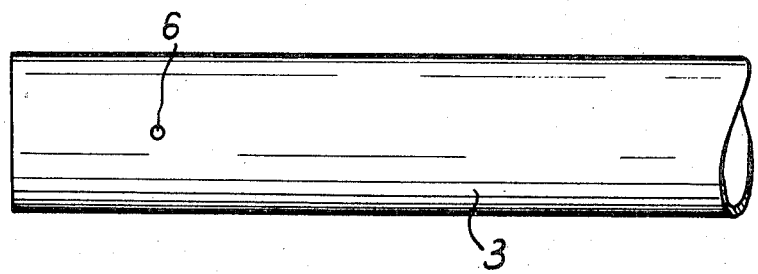
FIG. 3 illustrates the end of a fishing-rod section adapted to receive a ferrule according to this invention.
Figure 4:
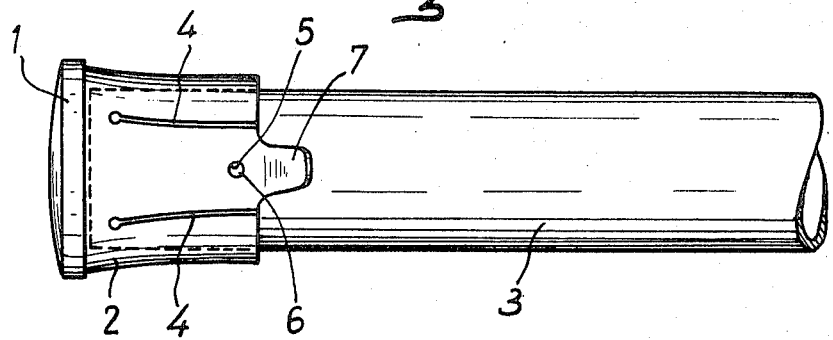
FIG. 4 is a view showing the fishing-rod section of FIG. 3 provided with the corresponding ferrule.

In the drawing, the ferrule according to this invention consists of moulded plastic and comprises a bottom 1 and a skirt 2 adapted to cover one portion of the end 3 of a fishing-rod section or element. This skirt 2 having an inner diameter very slightly greater than the outer diameter of the end 3 of the fishing rod section has formed therein axial slots 4 (which are four in number on the example illustrated) affording a certain tolerance for accomodating the slight differences in diameter usually observed in the manufacture of fishing rod elements or sections.

In the vicinity of its lower or outer edge the skirt 2 of ferrule 1 comprises an opening 5 adapted to be engaged, in the normal closing position of the ferrule, by a stud 6 projecting radially outwards from the outer surface of the end 3 of the fishing rod section. It is clear that when the stud 6 has penetrated the opening 5 the ferrule is positively held against movement, notably axial movements, and is therefore safely anchored to the end of the fishing rod section.

To permit the removal of this ferrule, the lower end of the skirt 2 thereof has moulded integrally therewith a small lug 7 slightly inclined outwards in relation to the ferrule axis, so that pulling this lug 7 outwardly with the finger will permit, due to the flexibility of the adjacent skirt portion which is caused by the presence of the axial slots 4, of releasing the stud 6 from the opening 5, whereafter pulling the ferrule proper in the axial direction and away from the fishing rod section 3 will separate the ferrule from the rod.

It is clear that the present invention provides a ferrule of particularly simple design and of very low cost compared with that of conventional plain ferrules and which, in its operative position, constitutes a particularly reliable device free of any fitting problem even in case of rod ends having appreciable differences in diameter as usually encountered in the manufacture of fishing rods.

Obviously, the above description is given by way of example only and should not be construed as limiting the scope of the invention, since various modifications may be brought thereto without departing from the basic principles of the invention as set forth in the appended claims.

Thus, more particularly, the opening 5 may if desired by formed in the end of the fishing rod section and the studs may be carried by the inner surface of the skirt 2.

What I claim is:

1. Closing ferrule for an end of a hollow fishing rod section, comprising a fishing rod section, a stud extending radially from the external wall of one end of said fishing rod section, a one piece body of radially expansible plastic having a bottom and a peripheral skirt extending from said bottom and having an open end defined by a free edge thereof, said body being longitudinally releasably mounted on and capping externally said end of said fishing rod section thereby closing the section, said skirt being provided with longitudinal slots formed therein and extending up to said open end and said ferrule skirt having a hole formed therein and detachably receiving said stud.

2. Closing ferrule for an end of a hollow fishing rod section, comprising a fishing rod section having one end with a hole formed along the length thereof, a one piece body of radially expansible plastic having a bottom and a peripheral skirt extending from said bottom and having an open end defined by a free edge, said body being longitudinally releasably mounted on and capping externally said end of said fishing rod section thereby closing the section, said skirt being provided with longitudinal slots formed therein and extending up to said free edge and, said skirt having an internal face, a stud being formed on said skirt internal face and detachably engaging said hole.

3. Closing ferrule as claimed in claim 1, wherein said free edge of said peripheral skirt includes, in the vicinity of said hole, a lug-shaped extension capable of being pushed by a user's finger to disengage said stud of said fishing rod section from said hole of said ferrule skirt.

4. Closing ferrule as claimed in claim 2, wherein said free edge of said peripheral skirt includes, in the vicinity of said stud, a lug-shaped extension capable of being pushed by a user's finger to disengage said stud from said hole in said fishing rod section.

* * * * *